US007641151B2

(12) United States Patent
Janhunen

(10) Patent No.: US 7,641,151 B2
(45) Date of Patent: Jan. 5, 2010

(54) ELECTRIC SAIL FOR PRODUCING SPACECRAFT PROPULSION

(76) Inventor: Pekka Janhunen, Jäniksenpolku 4, Hämeenlinna (FI) FI-13600

(*) Notice: Subject to any disclaimer, the term of this patent is extended or adjusted under 35 U.S.C. 154(b) by 488 days.

(21) Appl. No.: 11/365,875

(22) Filed: Mar. 2, 2006

(65) Prior Publication Data

US 2007/0205331 A1 Sep. 6, 2007

(51) Int. Cl.
*B64G 1/40* (2006.01)

(52) U.S. Cl. ................................ 244/171.5; 244/158.2

(58) Field of Classification Search ................. 244/168, 244/171.1, 171.5, 158.2, FOR. 11, FOR. 113
See application file for complete search history.

(56) References Cited

U.S. PATENT DOCUMENTS

| | | | | |
|---|---|---|---|---|
| 4,614,319 | A * | 9/1986 | Drexler | 244/171.5 |
| 5,296,044 | A * | 3/1994 | Harvey et al. | 136/245 |
| 6,194,790 | B1 * | 2/2001 | Griffin et al. | 290/1 R |
| 6,260,808 | B1 * | 7/2001 | Bodeau et al. | 244/172.7 |
| 6,362,574 | B1 * | 3/2002 | Aguero et al. | 315/169.3 |
| 6,459,206 | B1 * | 10/2002 | Aguero et al. | 315/111.81 |
| 6,565,044 | B1 * | 5/2003 | Johnson et al. | 244/171.5 |
| 6,689,952 | B2 * | 2/2004 | Kawaguchi | 290/50 |
| 6,758,443 | B1 * | 7/2004 | Levin et al. | 244/158.2 |
| 6,942,186 | B1 * | 9/2005 | Levin et al. | 244/158.2 |
| 7,413,147 | B2 * | 8/2008 | Bae | 244/164 |
| 2003/0010869 | A1 * | 1/2003 | Kawaguchi | 244/168 |
| 2003/0213874 | A1 * | 11/2003 | Ockels et al. | 244/172 |
| 2005/0274849 | A1 * | 12/2005 | Klosner et al. | 244/171.5 |
| 2007/0210213 | A1 * | 9/2007 | Levin | 244/172.7 |
| 2008/0217482 | A1 * | 9/2008 | Ellinghaus | 244/171.1 |

OTHER PUBLICATIONS

"Orbital Maneuvering with Spinning Electrodynamic Tethers", Jerome Pearson, et al., American Institute of Aeronautics and Astronautics, 2nd International Energy Conversion Engineering Conference, Providence, Rhode Island, Aug. 16-19, 2004 (7pgs).*

"Modular Spacecraft with Integrated Structural Electrodynamic Propulsion", Nestor Voronka, Tethers Unlimited, Defensetech.org, http/www.defensetech.org/archives/0011621.html Jun. 16, 2005 (2 pgs).*

* cited by examiner

*Primary Examiner*—Michael Carone
*Assistant Examiner*—Benjamin P Lee
(74) *Attorney, Agent, or Firm*—Young & Thompson

(57) ABSTRACT

A spacecraft propulsion system includes a plurality of wires (102) or other electrically conductive elongated members deployed from a main body (101) into respective radial directions. An electric potential generator (605) generates an electric potential on board the main body (101). The electric coupling between the electric potential generator (605) and the elongated members is controlled (604) so that all or some of the elongated members (102) assume a high positive potential. An auxiliary propulsion system (203) rotates the main body around a rotational axis (502) that is perpendicular to the radial directions, thus creating a centrifugal supporting force to the elongated members.

19 Claims, 3 Drawing Sheets

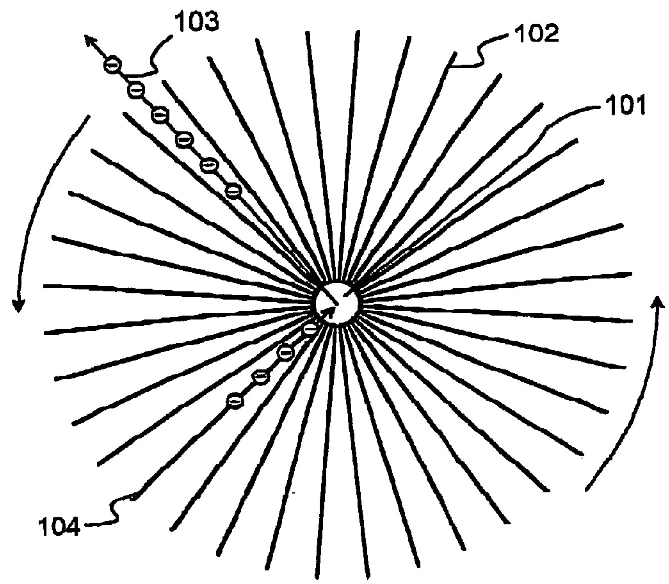
Fig. 1
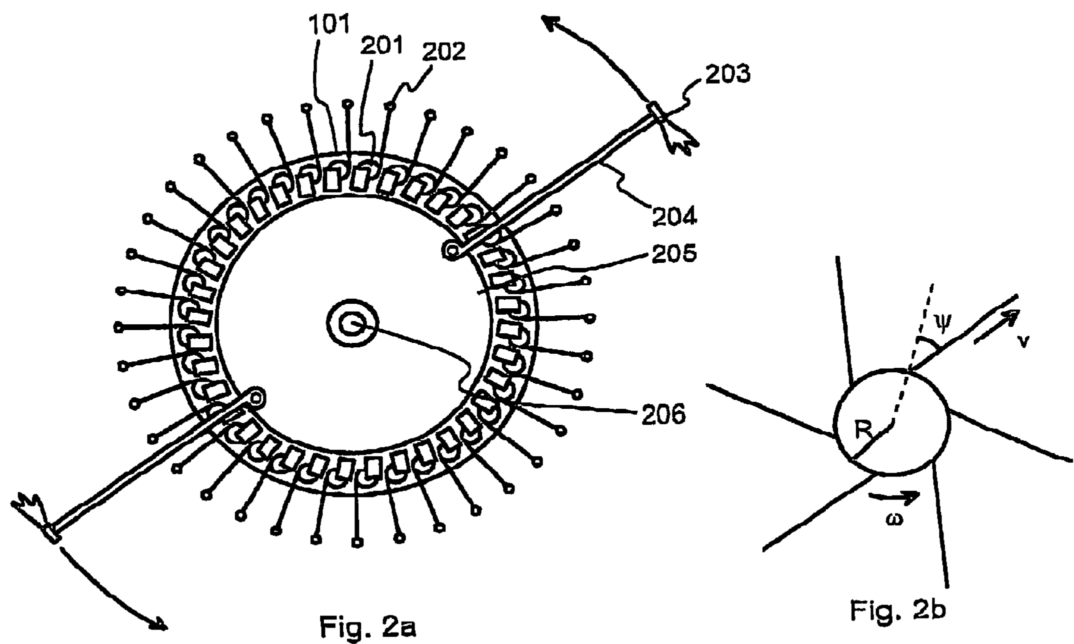
Fig. 2a
Fig. 2b

ELECTRIC SAIL FOR PRODUCING SPACECRAFT PROPULSION

TECHNICAL FIELD

The invention concerns generally the technology of spacecraft propulsion. Especially the invention concerns the technology of utilizing solar wind as the source of propulsive force.

BACKGROUND OF THE INVENTION

A spacecraft propulsion system is a subsystem of a spacecraft whose purpose is to change the state of motion of the spacecraft from its natural Keplerian motion. The Keplerian motion is due to the gravity field of the solar system bodies. Among the figures of merit of a propulsion system are the payload mass fraction and the delta-v the propulsion system can produce. Larger is better for both figures of merit. The payload mass fraction is the payload mass divided by the total initial mass (payload mass plus initial propulsion system mass) of the spacecraft. The delta-v is the time integral, computed over the working time of the propulsion system, of the non-gravitational acceleration provided by the propulsion system.

Conventional propulsion systems include chemical rockets and electric propulsion. For payload mass fraction of ⅓ the best chemical rocket bipropellant (liquid hydrogen plus liquid oxygen) provides a delta-v of about 1 AU/year, where AU means one astronomical unit, essentially equal to 150 million kilometres. Higher delta-v values are possible but with exponentially decreasing payload mass fraction. For electric propulsion systems a firmer delta-v value does not exist, but typical values for realized missions are 2-4 AU/year. These delta-v values are not sufficiently high for many purposes, e.g. for reaching outer solar system targets in a reasonable time. While somewhat higher delta-v values can be generated by reducing the payload mass fraction to a minimum, for a fixed payload this means an exponential growth of the initial mass and corresponding exponential increase of the mission cost.

For producing propulsive force alternative solutions exist that take advantage of naturally occurring phenomena in space. A solar sail is a large sheet of thin membrane that the spacecraft deploys once outside the Earth's atmosphere. Photons originating from the Sun hit the sail as a continuous stream, thus transferring momentum to it. A magnetic sail consists of one or more large-area loops of (preferably super conductive) wire, through which an electric current is driven in order to create a magnetic field. The field interacts dynamically with the solar wind and generates a propulsive force. A magnetic sail is known from the prior art publication R. M. Zubrin, D. G. Andrews: "Magnetic sails and interplanetary travel", Journal of Spacecraft and Rockets, Vol. 28, No. 2, pp. 197-203, published in 1991.

The idea of using solar wind for generating propulsion is also known from the publication P. Janhunen: "Electric Sail for Spacecraft Propulsion", Journal of Propulsion and Power, Vol. 20, No. 4, pp. 763-764, published in 2004 and incorporated herein by reference. Solar wind means the continuous stream of charged particles, mostly high-energy electrons and protons, that the Sun emits continuously to essentially all radial directions. An electric sail is an electrically conductive structure that is held at a positive potential with respect to the solar wind plasma. In contrast to the solar sail which extracts momentum from the Sun's electromagnetic radiation and not the solar wind, the electric sail does not need to be a continuous sheet. Said prior art publication presents an example in which the electric sail is a mesh of wires with a spacing less than or equal to the so-called Debye length of the plasma. The Debye length is a measure of the distance over which an Individual charged particle can exert an effect.

Although the usability of an electric sail for spacecraft propulsion has thus been theoretically shown, there are no known practical solutions that would be applicable to implement the principle on actual space missions.

SUMMARY OF THE INVENTION

An objective of the invention is to present a practically applicable electric sail system. Another objective of the invention is to present a spacecraft propulsion subsystem that facilitates easy and reliable deployment of the electric sail. A further objective of the invention is to present a method and a system with which it is possible to steer an electric-sail-propelled spacecraft. Yet another objective of the invention is to present an electric sail system that is tolerant against micrometeors and other hazards caused by the space environment.

The objectives of the invention are achieved by making the electric sail comprise a number of radially extending multifilament wires that are held tight by the centrifugal force.

A spacecraft propulsion system according to the invention comprises:

- a plurality of electrically conductive elongated members adapted to be deployed from a main body Into respective radial directions,
- an electric potential generator adapted to generate an electric potential on board said main body,
- a controllable electric coupling between said electric potential generator and said plurality of electrically conductive elongated members, and
- an auxiliary propulsion system adapted to rotate said main body around a rotational axis that is perpendicular to said radial directions.

The Invention applies also to a method for changing the state of motion of a spacecraft from its natural Keplehan motion. The method according to the invention comprises:

- generating an electric potential on board a main body of the spacecraft.
- controlling an electric coupling between the generated electric potential and a plurality of electrically conductive elongated members deployed from said main body into respective radial directions, and
- rotating said main body around a rotational axis that is perpendicular to said radial directions in order to cause a centrifugal tensile force to said plurality of electrically conductive elongated members.

Additionally the invention applies to a computer program product on a computer-readable medium. A computer program product according to the invention comprises software instructions that, when executed In a computer System, cause the implementation of:

- controlling the generation of an electric potential on board a main body of a spacecraft,
- controlling an electric coupling between the generated electric potential and a plurality of electrically conductive elongated members deployed from said main body into respective radial directions, and
- controlling the rotation of said main body around a rotational axis that is perpendicular to said radial directions in order to cause a centrifugal tensile force to said plurality of electrically conductive elongated members.

In the invention we utilise the fact that an electric sail does not need to be a continuous membrane like a solar sail, but even a relatively sparse mesh will do. Additionally we utilise the principle of the so-called centrifugal force, which means that a mass fixed to a rotating object and not located on the axis of rotation will create a constant pulling force in the radial direction. Deploying -a number of wires extending radially into space from a spinning spacecraft will result in a spinning, cartwheel-like configuration, where the centrifugal force keeps the radially extending wires tight.

If the wires are electrically conductive, it is possible to keep them at a positive potential relative to the surrounding plasma by coupling them electrically to an electron gun on board the spacecraft. The positive potential of the wires causes an electrostatic Coulomb force interaction with the protons of the solar wind, which in turn transfers momentum from the solar wind to the wires and therethrough to the whole spacecraft. Drawing electrons from the wires to the spacecraft body and emitting them to space with the electron gun counteracts the effects of solar wind electrons, which would otherwise neutralise the positive potential. Many kinds of steering manoeuvrea become possible, if the rate at which electrons are drawn from each wire is controllable.

Advantageous embodiments of the invention are discussed in the depending claims. The features recited in depending claims are mutually freely combinable unless otherwise explicitly stated. The exemplary embodiments of the invention presented in this patent application are not to be interpreted to pose limitations to the applicability of the appended claims. The verb "to comprise" is used in this patent application as an open limitation that does not exclude the existence of also unrecited features.

The novel features which are considered as characteristic of the invention are set forth in particular in the appended claims. The invention itself however, both as to its construction and Its method of operation, together with additional objects and advantages thereof, will be best understood from the following description of specific embodiments when read in connection with the accompanying drawings. The drawings are schematic only and not drawn to scale.

BRIEF DESCRIPTION OF DRAWINGS

FIG. 1 illustrates the principle of a centrifugally supported electric sail, FIGS. 2*a* and 2*b* illustrate certain aspects of wire deployment.

DETAILED DESCRIPTION OF THE INVENTION

Principal Configuration

Figure 3:
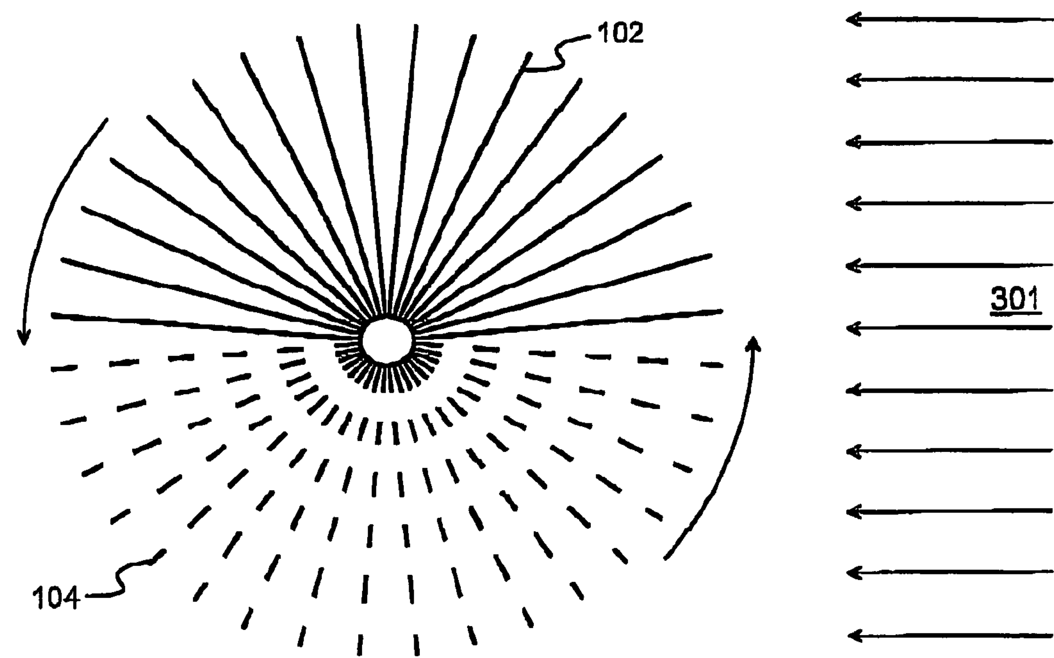
FIG. 3 illustrates the principle of solar wind assisted spinning.

FIG. 1 illustrates schematically the basic principle of an electric sail that consists purely of radially extending wires, with no perimeter connection or other interconnections between the wires. In the middle there is the main body 101 of the spacecraft. Extending radially outwards from the main body 101, there are a number of wires, of which wire 102 is an example. The whole system rotates (spins) around a rotational axis that is perpendicular to the plane of the paper and goes through the contra of gravity of the system, which we assume to coincide with the center of the main body 101. The system is in a space environment, which means that there is essentially no similar drag caused by any surrounding medium as for example in the Earth's atmosphere. On the other hand, since each noncentrally located piece of a system rotating at constant angular velocity requires a constant centripetal force to keep It on its circular orbit, the result of the spinning movement is that all wires are kept tight and point essentially directly to the respective radial direction.

We also assume that the main body 101 of the spacecraft comprises an electron gun or corresponding means for controllably emitting a stream 103 of negative charges (essentially: electrons) to space. The stream of negative charges can basically be emitted to any direction, for example along the spin axis of the spacecraft to the downstream direction of the surrounding plasma flow. Emitting negative charges will cause the main body 101 to assume a positive potential with respect to the surrounding plasma. If the wires are electrically conductive and have an electrically conductive connection to the main body 101, electrons flow from the wires to the main body as is shown on wire 104 and the wires too assume a positive potential. The overall electric field of the Spacecraft shown in FIG. 1 starts to resemble that of a positively charged conductive disc. A minimum useful potential for the wires is about 1 kV, which corresponds to the typical kinetic energy of solar wind protons. Higher values like 8-20 kV are likely to be more beneficial.

The solar wind consists of protons and electrons moving essentially radially outwards from the Sun at high speed, typically 400-800 km/s. The disc-like electric field of the spacecraft repels the positively charged protons in accordance with Coulomb's law, which means that the continuous stream of solar wind protons pushes the spacecraft much like the ordinary wind would push a circular sheet of windproof material in the Earth's atmosphere. The electrons of the solar wind are attracted by the positive potential of the wires (and of that of the main body 101), but since the momentum carried by electrons is negligible compared to that carried by protons, essentially the only noticeable electron effect is the tendency of the gathered electron current to neutralise the positive potential. The efficiency of the apparatus used to emit the electron stream 103 from the spacecraft must be high enough to counteract the neutralising effect of the gathered electron current.

Wire Material and Construction

Experiments and calculations suggest that a single thin monofilament wire 100 meters long would only survive some months in space before getting severed by a micrometer. The "wires" that constitute the electric sail must therefore not be monofilament wires but have a construction that has better chances to survive. A number of suitable construction principles have been suggested for other purposes in space technology. Various kinds of braids, multifilament wires, cables, ropes and tethers can be used. One possible construction is the one introduced as Hoytether in a reference publication U.S. Pat. No. 6,286,788 B1. The wires can also have the appearance of a band. For simplicity, only the term "wire" is used throughout this description, but all other elongated member constructions are encompassed as well. The operating principle as such would not exclude even rigid rod- or beam-like constructions, but it would be extremely difficult to construct an ultra-light-weight deployable structure of the required dimensions from rigid pieces.

The relatively high positive potential and electric conductivity of the wire means that if and when it consists of a number of separate filaments or component strings, these are all in the same potential and repel each other. Thus the filaments or component strings are naturally kept apart, which reduces the risk that a micrometer would cut all of them simultaneously.

The wire material should have high tensile strength, low density and good electrical conductivity. Good material choices include steel alloys and other metals that have high tensile strength. The wire material may also be a composite, like a carbon fiber or aramid fiber core with a surface metallization or other electrically conductive coating, or a metal core wire with fiber coating.

The wire should be as thin as possible, not only in order to save mass and space in the spacecraft before electric sail deployment but also In order to keep the gathered electron current constituted by the solar wind elections as low as possible. The electron current is approximately proportional to the outer surface area of the wires.

How long the wires will be depends on many factors, like the total number of wires, spacecraft mass, desired magnitude of propulsion, intended orbit radius (i.e. distance from the Sun) and the like. As a rough assumption, the wires could be for example 10 kilometres long. An ultimate limit of the length of the wires comes from the tensile strength of the wire material: each segment of wire must stand the centripetal force (plus a safety marginal) that the remaining portion of wire between that segment and the distant end will cause. It is naturally possible to use wires that have non-constant cross-section, so that the tensile strength of the wire would be a decreasing function of the distance from the main body of the spacecraft towards the distant end of the wire. All wires need not be of equal length.

Deployment Procedure

Initially the wires or wire groups are stored on reels, FIG. 2*a* shows schematically an exemplary configuration, where the reels 201 are located at the edge of the generally disk-like main body 101 of the spacecraft. When the spacecraft Is set to rotation, the wires unwind themselves assisted by the centrifugal force. Depending on the wire properties and the reel diameter, the unwound wire may have a tendency to curl up slightly. If this threatens to prohibit the windup process from starting properly, the use of a small ballast mass 202 at the end of the wire fixes the situation. The ballast mass 202 needs to be only a fraction of the total mass of the ire, so its effect on the mass budget of the propulsion system is minimal.

If the reels are unwound at constant speed, the wires are straight during the deployment process, but inclined in an angle to the radial direction. The angle depends on the rotation speed, unwinding speed and radial distance of the support point of the wire from the center of rotation of the system; the dependency is of the form $\sin\psi=2v/R\omega$, where $\psi$ is the angle between the wire and the radial direction, v is the speed at which the wire is deployed, R is the radial distance of the support point end $\omega$ is the angular speed of the system. The term "system" means here the whole mechanical system, i.e. the main body 101 of the spacecraft and the wires which are being unwound. FIG. 2*b* illustrates said quantities graphically.

During deployment, the system's total angular momentum tends to stay constant, which means that the rotation rate of the system tends to decrease when the wire unreeling process proceeds. Thus, either the deployment must begin when the spacecraft is spinning at a relatively high rate, which decreases during the unreeling process and eventually reaches a suitable final value when the wires have been fully deployed, or a torque must be applied continuously or intermittently during deployment to increase the angular momentum. A straightforward way of obtaining this torque is to use an auxiliary, conventional propulsion system. To maximise the torque, the value of which is thrust force times arm length, the propulsive units 203 of the auxiliary system should be placed as far as possible from the center of rotation of the system, e.g. at ends of long propulsion arms 204. The propulsive units 203 can be e.g. small chemical rockets, pressure release thrusters, ion or plasma engines or any other suitable propulsion-generating means.

In the exemplary embodiment of FIG. 2*a* the auxiliary propulsion system comprises a propulsion platform 205 and its attachment 206 to the main body 101 of the spacecraft. One possibility is to make the attachment 206 rotatable with a controllable mechanical interaction with the main body. In such an embodiment the propulsive units 203 would be used to spin up the auxiliary propulsion system, which would rotate in relation to the main body 101, and use said controllable mechanical interaction to controllably administrate angular momentum from the spinning auxiliary propulsion system to the main body 101.

The auxiliary propulsion system and Its propulsion arms 204 are not needed after the deployment phase is complete, so if wanted, they can be detached (jettisoned) to increase performance during the propulsive stage. If flight-time wire length control is not used, the wire reels 201 are also not needed after the wires have been unwound. Therefore, they can also belong to the detached system. In such a case, a mechanism must exist for re-attaching the wires from the reels to the main body 101 of the spacecraft. The eventual rotation rate of the spacecraft with fully deployed wires might be for example one whole turn in every 5 minutes, but this is an exemplary value only and does not limit the applicability of the invention. The rotation rate must be selected so that taken the maximum expected rate of solar wind and the voltage value of the wires, the centrifugal motion is still sufficient to keep the wires from bending by more than some suitable limiting value.

Besides by conventional propulsion, one may also add angular momentum to the system by having the spin axis partly or completely perpendicular to the solar wind flow during the deployment phase and keeping the voltage of a wire at a higher value when the wire is during its rotation moving along the solar wind than when it Is moving in the opposite rotation phase back towards the solar wind flow. This principle is illustrated in FIG. 3, where the solar wind 301 now comes from the right. Wires shown as continuous lines, like wire 102, have their voltage turned higher than wires shown as dashed lines, like wire 104. When part of the needed angular momentum is obtained from the solar wind, the auxiliary propulsion system can be correspondingly smaller.

Figure 4:
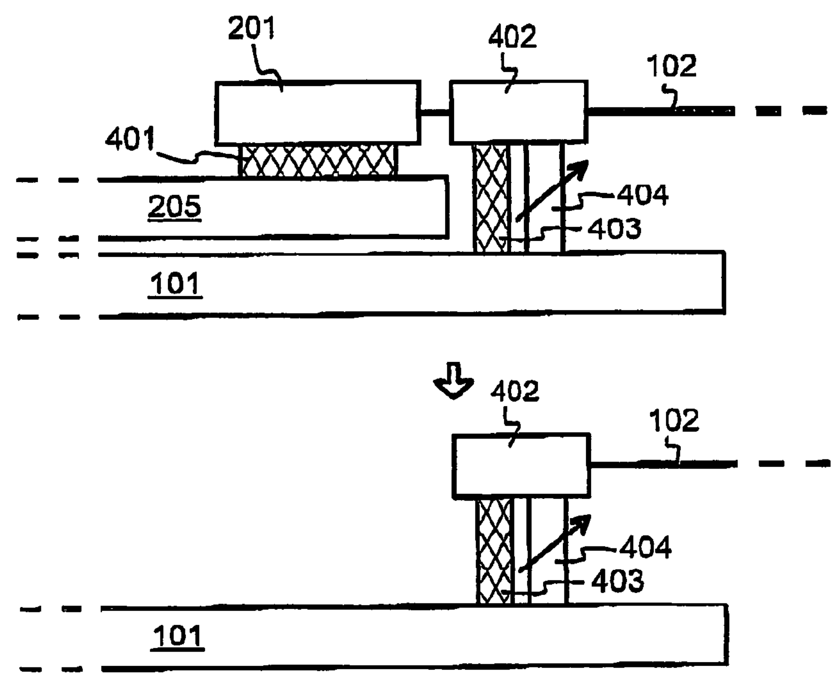
FIG. 4 illustrates certain structural considerations of attaching the wires.

FIG. 4 summarizers schematically certain structural aspects of the wire deployment and attachment technique. In the exemplary embodiment of FIG. 4 the main body 101 of the spacecraft has initially a propulsion platform 205 attached to it. The wire reels 201 are attached to the propulsion platform 205 with an electrically isolating attachment 401. Attached to the main body 101 there is a wire holder 402, through which the wire 102 is deployed Into space. The attachment of the wire holder 402 to the main body 101 is here shown to comprise an electrically isolating mechanical attachment 403 and a controllable potentiometer 404, which constitutes the only electrically conductive connection between the wire 102 and the main body 101 of the spacecraft, and which can thus be used to individually control the voltage of each wire. In the lower portion of FIG. 4 the wire 102 has been fully deployed and is only held by the wire holder 402. The auxiliary propulsion system and the wire reels have been jettisoned.

Achieving and Controlling the Electric Potential of the Wires

To maintain the wires at a positive potential, one must produce an electric current from the surrounding plasma into the spacecraft. Emitting electrons with an electron gun is a straightforward and well-known way of accomplishing this. The electricity needed by the electron gun can be obtained from solar panels or some other onboard power source. Using solar panels has the benefit that the electron current that the wires and the main body of the spacecraft gather from the ambient solar wind plasma is proportional to the solar wind plasma density, which in turn is known to be, on the average, inversely proportional to the squared distance from the Sun. The power produced with solar panels scales in the same way so that the electric power needed versus the maximum power that can be produced by the panels is approximately the same at all radial distances from the Sun. If some other power source having constant output power (like radiothermal power generator, RTG) is used, most of its output is not needed by the propulsion system once the mission moves away from the Sun. Depending on the mission, this may or may not be a benefit.

Electron current is gathered from the ambient plasma not only by the wires, but also by the spacecraft itself and Its structures (Including solar panels, if any). If a compact but otherwise arbitrarily shaped spacecraft of reasonable size would reside in space without the wires. It would create a nearly spherically symmetric potential pattern around itself. In other words it would act approximately as a spherical probe embedded in plasma. Calculating the gathered current one finds that the spacecraft would gather so much electron current in this case that keeping it at large positive potential with an electron gun might be difficult. When the radially extending, positively charged wires are added to the system, however, the current gathered by the spacecraft decreases dramatically because the potential pattern around the spacecraft and wires becomes disk-like. An electron approaching the system from outside is nearly as much attracted by the wire plane as by the spacecraft body. When attracted by the wire plane, it is very likely to move through the plane rather than hitting a wire because the wires are very thin. Thus the radial, centrifugally supported wire plane that is characteristic to this invention automatically solves the possible problem of prohibitively high gathered electron current.

Control and Navigation

Figure 5A:
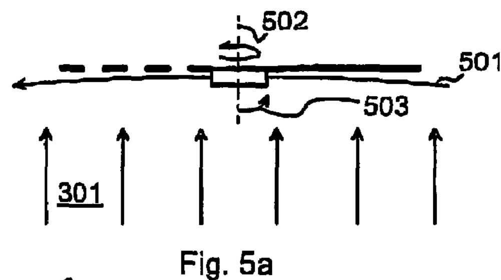
FIGS. 5*a*, 5*b* and 5*c* illustrate manoeuvres with an electric sail.
Figure 5B:
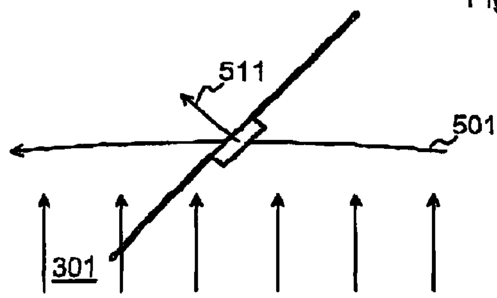
Figure 5C:
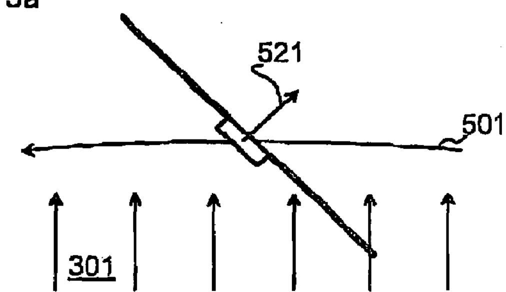

FIGS. 5*a*, 5*b* and 5*c* illustrate how the electric sail is used for navigation. The spacecraft orbits the Sun on an elliptic orbit 501, according to the Keplerian laws of motion. The solar wind 301 constitutes an essentially laminar flow in the direction perpendicular to the orbit in the orbit plane. The spacecraft spins around a rotational axis 502 that here is also in the orbit plane. In FIG. 5*a* we assume that the rotational axis 502 is initially perpendicular to the orbit, which means that the disklike electric sail faces directly the solar wind 301. Neglecting the effect of the spinning motion at first, we also assume in FIG. 5*a* that the spacecraft utilises the wire-specific potentiometers to turn on the voltage only in those wires that are on the right-hand half of the electric sail when looked at from the direction of the Sun. FIG. 5*a* this is illustrated by representing those wires with a continuous line that have their voltage turned on, and those wires with a dashed line that have their voltage turned off. The result is that the solar wind only exerts pressure on the right-hand half of the electric sail, which in turn causes a torque that tends to turn the rotational axis 502 into the direction shown with a curved arrow 503.

A force that tries to turn the rotational axis of a spinning body interacts with the angular momentum of the body to cause a resultant that acts in the direction that is perpendicular to both the original rotational axis and the original force. This means that if the spin axis of the spinning electric-sail-propelled spacecraft is to be turned by changing the potentials of the wires, the timing of the switching must be accomplished taking the angular momentum into account so that the eventual resultant force will point into the right direction. Another modification to the crude model considered above is that the wire potentials should not be simply switched on and off, but to higher and lower values according to a suitable, carefully considered strategy. Using only "on" and "off" values would cause too large instantaneous changes to the forces that act upon the wires.

A certain minimum amount of constant torque like that explained above would be needed anyway in most missions to keep the electric sail facing directly the solar wind, because without any torque the spinning spacecraft would tend to maintain the inertial orientation of its rotational axis. However, we assume that the torque is larger than said minimum value, so that the spacecraft will turn into the position shown In FIG. 5*b* In relation to its orbit. Now full voltage is applied to all wires. As a result, the dynamic pressure of the solar wind will cause a resultant force 511. This force has a component in the forward-looking tangential direction of the orbit 501, which means that it increases the orbital velocity, causing the spacecraft to recede away from the Sun. The overall magnitude of the thrust Is proportional to the mean voltage of the wires, which in turn depends on the power used to operate the electron gun.

Had the initial selection of the side on which the voltage is turned on been different in FIG. 5*a*, the spacecraft would have turned into the position shown in FIG. 5*b* in relation to its orbit. Now the resultant force 521 has a component in the backward-looking tangential direction of the orbit 501 which means that it decreases the orbital velocity, causing the spacecraft to assume a lower orbit closer to the Sun.

Since the voltage of each individual wire is separately controllable, oscillations in the wires that result from e.g. dynamic pressure pulses in the solar wind and make the electric sail resemble a round sea ray can be damped by increasing and de creasing the wire voltages according to need. A control system on the spacecraft may detect such oscillations through monitoring for example the impedances and tensions of the wires or through mechanically monitoring the pointing direction of each wire, or through any other suitable means.

The large group of radially extending wires that constitute the electric sail is mechanically a very complex entity. Since the wires are extremely long compared to the dimensions of the spacecraft main body, the wire experiences the main body only as a point mass attached to one end of the wire. After the initial moments of deployment the spinning movement of the main body has an essentially negligible effect on the angular speed at which the wire rotates around the spinning axis. Inevitably some of the wires will have a tendency to speed up or slow down in their angular motion, causing adjacent wires to touch each other and get tangled.

One possible way of preventing the effect described above may be clever enough control of wire potentials. The high electric potential of the same sign in each wire will cause the wires to repel each other, and this repulsion can be increased or decreased according to need by controlling the individual wire potentials. Another possibility is the so-called flight-time wire length control. This means using the wire reels or other available means to reel in or let out a length of the anomalously behaving wire. Reeling in some of the wire, i.e. decreasing the length of the extended part of the wire, causes the remaining part to gain angular speed according to the principle of conserving angular momentum. Correspondingly letting out an additional length of the wire will slow down its angular speed. Introducing flight-time wire length control naturally means that the wire reels cannot be jettisoned after the deployment phase.

The theoretical maximum value for the angle between radial outward direction and the direction of a wire extending into space from the rim of the spacecraft main body (see angle $\psi$ in FIG. 2*b*) is 90 degrees, because with a larger value the wire would start to wind around the spacecraft main body and/or touch the starting point of the adjacent wire. In practice the maximum allowable value must be somewhat less than 90 degrees so that the wire does not get dangerously close to the adjacent wire at its starting point. It is advantageous to equip the main body with additional propulsive means capable of increasing and decreasing the angular speed of the main body, so that by adding or taking off some of the spinning motion of the main body, each radially extending wire of the electric sail can be kept pointing into a direction as close to directly radial as possible. Said additional propulsive means can be any known propulsion generators, including but not being limited to chemical rockets, pressure release thrusters, ion engines and plasma engines.

System Level Considerations

Figure 6:
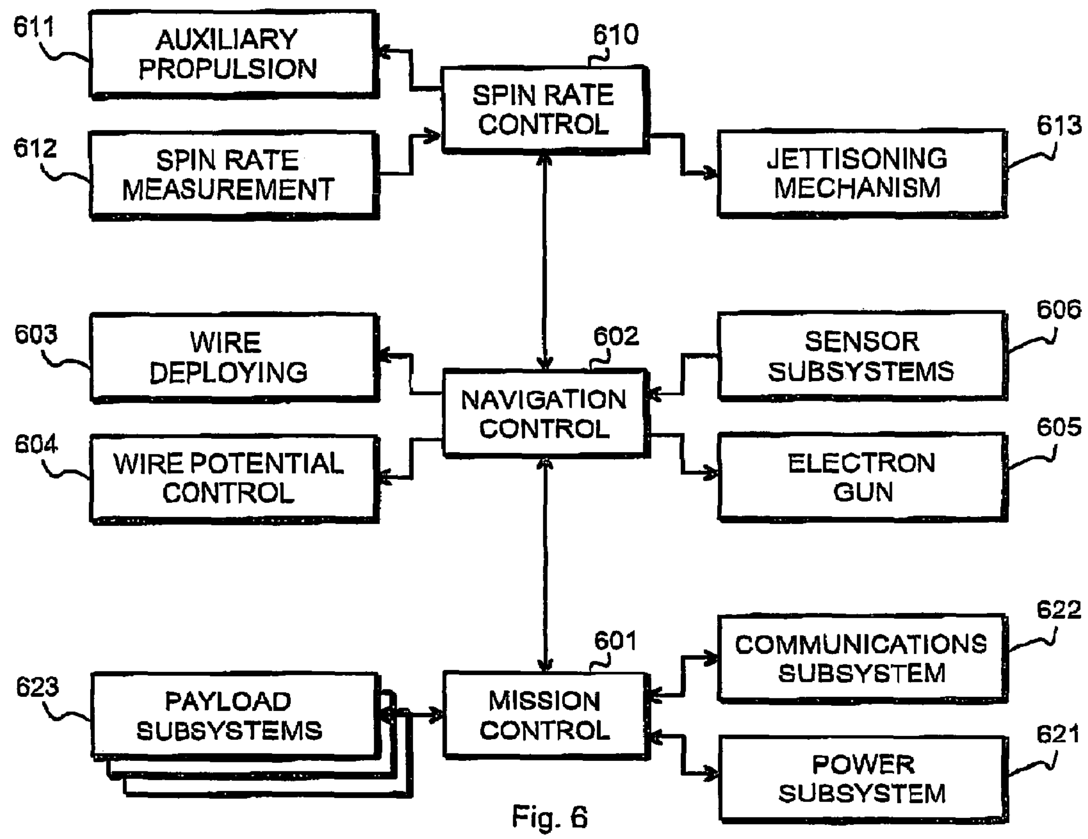
FIG. 6 illustrates an exemplary functional diagram of certain parts of a spacecraft with electric sail propulsion.

FIG. 6 illustrates some of the subsystems of an exemplary spacecraft that utilises an electric sail as propulsion means. The main control responsibility is on the mission control computer 601. A navigation control system 602 controls the wire deploying mechanisms 603 and the wire voltage potentiometers 604 as well as the electron gun 605, thus determining the amount and direction of thrust that the spacecraft will get from the electric sail. Also the damping of oscillations and other tasks directly related to the wire voltages are on the responsibility of the navigation control system 602. It has a number of sensors 606 at its disposal, including for example accelerometers, sun sensors, force detectors, wire impedance detectors, wire pointing direction detectors, and an electron detector arranged to measure the potential of the main body of the spacecraft with respect to the surrounding plasma.

A spin rate control mechanism 610 is separately shown, with the purpose of providing the necessary Initial angular momentum for wire deployment and increasing it during the wire deployment process. Shown also are the auxiliary propulsion mechanism 611, a spin rate measurement subsystem 612 and the jettisoning mechanism 613, if any, that may be used to get rid of unnecessary mass after the wires have been fully deployed.

The power subsystem 621 uses solar panels and/or other energy sources to provide the spacecraft, including the electron gun 605 with the necessary operating power. A communications subsystem 622 enables communications with ground control. The spacecraft may have various payload subsystems 623.

A spacecraft that uses an electric sail as its primary propulsion system in orbit could be used for various purposes, including Mercury-, Venus- or Sun-orbiting missions, fast fly by missions to outer solar systems objects and even interstellar missions outside the heliosphere, where the driving force is not any more solar wind but the flow of interstellar charged particles, the speed of which, however, is much slower than that of solar wind within the heliosphere. An electric sail could be used as braking means in a mission where the spacecraft would be propelled out of the heliosphere with some other means, like laser assisted solar sailing.

An interesting possibility would be to place an electric-sail-propelled spacecraft to some point on the direct axis between the Earth and the Sun. Previous missions of this kind have only involved placing a spacecraft to the so-called Lagrange point, in which the gravity of the Earth is just enough to keep the spacecraft on the proper orbit around the Sun despite of its orbit velocity being otherwise too low. It takes only about one hour for the solar wind to travel from the Lagrange point to the Earth's magnetosphere, which means that a spacecraft measuring disturbances in the solar wind there can not give a warning of changes in the solar weather very much in advance. An electric sail could enable a solar wind probe to hover at a location from which it takes e.g. five or six hours before the solar wind hits the Earth, which would give much more preparatory time for actions of protecting crews and equipment on spacecrafts orbiting the Earth. It would also increase dramatically the accuracy of predicting activity in the aurora borealis phenomena.

The embodiments that we have described above are exemplary and do not limit the applicability of the enclosed claims. For example, it is by no means mandatory to omit all transverse interconnections between wires, even if relying completely on radial wires will help to keep the deployment procedure as simple as possible. The potentiometers or other controllable electric couplings between the electron gun and the wires could be group-specific rather than wire-specific, so that the potential of each wire group rather than each individual wire is controlled. Two or more electron guns can be used as the electric potential generator on board the spacecraft. The main body of the spacecraft does not need to be disk-like, and the electric sail does not even need to be attached to the main body; the electric sail may be located e.g. in a separately spinning subpart that is connected to a non-spinning main body. One spacecraft may have two or more electric sails, much like some helicopters have two main motors.

I claimed:

1. A system, comprising:

a main body of a spacecraft, a plurality of electrically conductive elongated members adapted to be deployed from said main body into respective radial directions, each of said electrically conductive elongated members having an electric coupling at exactly one end of the electrically conductive elongated member, an electric potential generator adapted to generate an electric potential on board said main body, and a propulsion system adapted to rotate said main body around a rotational axis that is perpendicular to said radial directions, wherein said system is configured to controllably couple said electric potential generator to said electric coupling at only one end of the electrically conductive elongated member to maintain at least some of said electrically conductive elongated members at a net electric potential with respect to a surrounding of said system.

2. The system according to claim 1, wherein each of said plurality of electrically conductive elongated members is one of the following: multifilament wire, braid, cable, band, tether.

3. The system according to claim 2, comprising a plurality of reels for storing said plurality of electrically conductive elongated members before deployment.

4. The system according to claim 2, wherein there are no transverse couplings between adjacent ones of said plurality of electrically conductive elongated members.

5. The system according to claim 1, wherein said electric potential generator comprises an electron gun adapted to emit electrons from said main body.

6. The system according to claim 1, wherein said system comprises a controllable electric coupling between said main body and each of said plurality of electrically conductive elongated members.

7. The system according to claim 6, wherein said controllable electric couplings are electrically controllable potentiometers.

8. The system according to claim 1, comprising propulsive units adapted to controllably produce an angular momentum around said rotational axis.

9. The system according to claim 8, wherein said propulsive units are located in a detachable platform.

10. The system according to claim 9, comprising storage mechanisms for storing said plurality of electrically conductive elongated members before deployment, wherein said storage mechanisms are located in said detachable platform.

11. The system according to claim 1, comprising a navigation system adapted to control the net electric potential of at least some of said electrically conductive elongated members in order to change the attitude of the spacecraft in relation to a surrounding flow of charged particles.

12. The system according to claim 1, comprising a navigation system adapted to controllably change the extended length of individual electrically conductive elongated members.

13. The system according to claim 1, comprising sensors adapted to sense mechanical oscillations in said plurality of electrically conductive elongated members, and a control system adapted to control the net electric potential of at least some of said electrically conductive elongated members in order to damp detected mechanical oscillations.

14. A method for changing a state of motion of a spacecraft from its natural Keplerian motion, comprising:

generating an electric potential on board a main body of the spacecraft, controlling an electric coupling between the generated electric potential and only one end of a plurality of electrically conductive elongated members deployed from said main body into respective radial directions to maintain at least some of said electrically conductive elongated members at a net electric potential with respect to a surrounding of said spacecraft, and rotating said main body around a rotational axis that is perpendicular to said radial directions in order to cause a centrifugal tensile force to said a plurality of electrically conductive elongated members.

15. The method according to claim 14, wherein a subset of said electrically conductive elongated members is dynamically kept at a positive potential with respect to a flow of charged particles around the spacecraft, in order to create a torque that modifies a rotation state of the spacecraft.

16. The method according to claim 15, wherein:

said rotational axis is kept perpendicular to said flow of charged particles around the spacecraft, and said subset of said electrically conductive elongated members consists of such electrically conductive elongated members that due to the spacecraft's rotation around said rotational axis move along with said flow of charged particles around the spacecraft, in order to increase the spacecraft's angular momentum around said rotational axis.

17. The method according to claim 16, wherein the method steps are performed during a deployment phase of said electrically conductive elongated members from the main body of the spacecraft, and the centrifugal force associated with said angular momentum assists in the deployment.

18. The method according to claim 15, wherein:

said rotational axis is kept in an orbital plane of motion of the spacecraft and non-perpendicular to said flow of charged particles around the spacecraft, said subset of said electrically conductive elongated members consists of an essentially equal number of electrically conductive elongated members above and below said orbital plane of motion, and all electrically conductive elongated members of said subset are on the same side, which is either the leading side or the trailing side, of the main body of the spacecraft in relation to its orbital motion, in order to turn said rotational axis in said orbital plane of motion.

19. The method according to claim 14, comprising controllably changing the extended length of individual electrically conductive elongated members after an initial deployment of said electrically conductive elongated members, in order to controllably change angular speeds of individual electrically conductive elongated members around said rotational axis.

* * * * *

UNITED STATES PATENT AND TRADEMARK OFFICE

CERTIFICATE OF CORRECTION

PATENT NO. : 7,641,151 B2
APPLICATION NO. : 11/365875
DATED : January 5, 2010
INVENTOR(S) : Pekka Janhunen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this

Twenty-first Day of December, 2010

David J. Kappos
*Director of the United States Patent and Trademark Office*